United States Patent [19]

Tschursch

[11] 4,128,152

[45] Dec. 5, 1978

[54] RATCHET TRANSMISSION

[75] Inventor: Arnold Tschursch, Hinrichssegen, Fed. Rep. of Germany

[73] Assignee: Fritzmeier AG, Lenzburg, Fed. Rep. of Germany

[21] Appl. No.: 785,176

[22] Filed: Apr. 6, 1977

[51] Int. Cl.² ............... F16D 41/16; F16D 21/06; B60N 1/06
[52] U.S. Cl. .................. 192/43.1; 74/146; 192/48.91; 192/48.92; 248/421; 297/345
[58] Field of Search ............. 192/43.1, 48.91, 48.92; 74/146; 297/345, 347; 248/280, 281, 421; 81/62

[56] References Cited

U.S. PATENT DOCUMENTS

| 313,967 | 3/1885 | Tiffany | 192/43.1 X |
| 397,387 | 2/1889 | Reisch | 192/43.1 X |
| 1,163,500 | 12/1915 | Ball | 192/43.1 X |
| 1,286,360 | 12/1918 | Leopold | 74/146 |
| 3,897,036 | 7/1975 | Nystrom | 248/421 X |

*Primary Examiner*—Allan D. Herrmann

*Attorney, Agent, or Firm*—Oblon, Fisher, Spivak, McClelland & Maier

[57] ABSTRACT

A ratchet transmission for height and weight adjustment of suspension seats of vehicles having two independent gear-shift-lever shafts rotatably disposed about a common axis within a gear casing, a pair of ratchet wheels being respectively rigidly fixed on the gear-shift-lever shafts, a cam disc abutted by the gear casing and swivelable around the axis of the gear-shift-lever shafts, a pair of counteracting and pre-tensioned pawls for each of the ratchet wheels which are selectively latchable thereto by turning the cam disc, a guide system for leading the vehicle seat in a straight line and a spring component, including an elevating screw turnable by one of the gear-shift-lever shafts, a roving nut and a compressed spring, the spring component being adjustable as a whole for, free of tension, the purpose of height adjustments, through one of the gear-shift-lever shafts, and the compressible spring being pre-tensioned through the other of the gear-shift-lever shafts, by axially moving the roving nut, which forms a movable buttress of the spring and which is itself movable together with the elevating screw.

13 Claims, 6 Drawing Figures

RATCHET TRANSMISSION

BACKGROUND OF THE INVENTION

1. Field of the Invention

The present invention relates generally to a ratchet transmission, and more particularly to a ratchet transmission for use as an adjustment device for a seat in a vehicle.

2. Description of the Prior Art

A diverse number of devices for making weight and height adjustments for vehicle seats are well known in which the adjustment for weight, for example, because of the relatively high amount of force needed, is mostly accomplished via a reversible ratchet, and in which the height adjustment is mostly accomplished by an independent adjustment device, either in the form of a parallelogram or a trapezoid rod system, such being operated by a jigger. These known height adjustment devices, however, are not useful, that is, they cannot function while the seat is weighted down.

SUMMARY OF THE INVENTION

A primary object of the present invention, therefore, is to provide a ratchet transmission which permits a height adjustment of a vehicle seat to be made even when the seat is weighted down.

This object and others are attained, according to the present invention, through the provision of two independent gear-shift-lever shafts, which are placed into a gear casing around a common axis of rotation and mounted in such a way that they can rotate thereabout. On these a ratchet wheel is rigidly mounted, which is adjoined by two counter-effective spring loaded pawls, which can selectively be engaged by turning a cam disc, attached to the gear casing. This cam disc is connected to a turning knob, radially protruding from the gear casing, by which it can be swiveled around the axis of the gear-shift-lever shafts.

An advantageous use for the transmission is found in connection with an oscillating spring action for the seats, from a guiding system for the straight guiding of the seat and from a spring element which is placed between two respectively moveable parts, whereby the spring element is made movable as a whole, free of tension, via one gear-shift-lever shaft for the height adjustment of the seat, and can be spring-loaded with the other lever shaft.

BRIEF DESCRIPTION OF THE DRAWINGS

Other objects, features and attendant advantages of the present invention will be more fully appreciated as the same becomes better understood from the following detailed description, when considered in connection with the accompanying drawings, wherein like reference numerals designate like or corresponding parts throughout the several views, and in which.

DETAILED DESCRIPTION OF A PREFERRED EMBODIMENT

Figure 1:
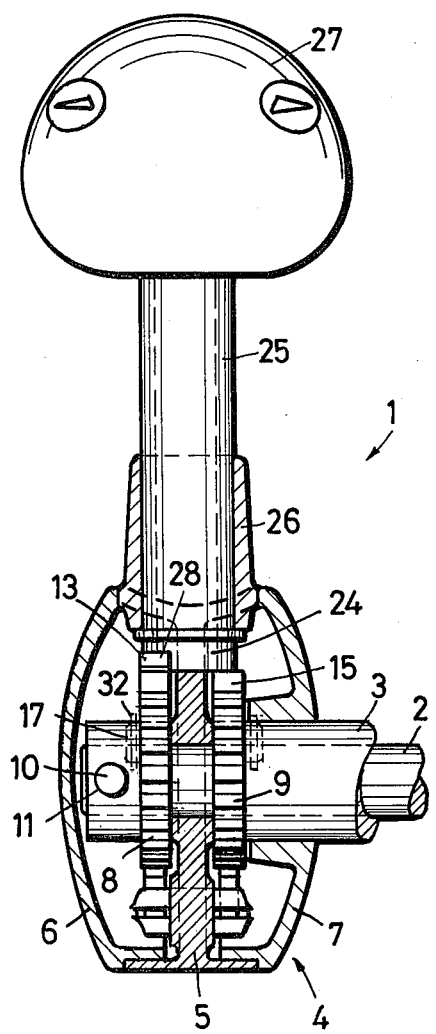
FIG. 1 is a cross-section of a ratchet transmission, according to the present invention.
Figure 2:
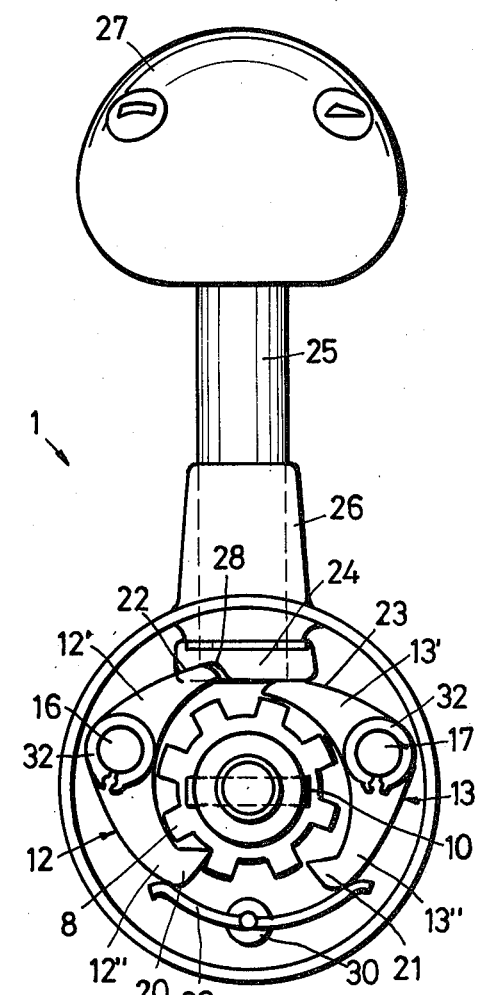
FIG. 2 is an elevational or end view of the ratchet transmission shown in FIG. 1.
Figure 3:
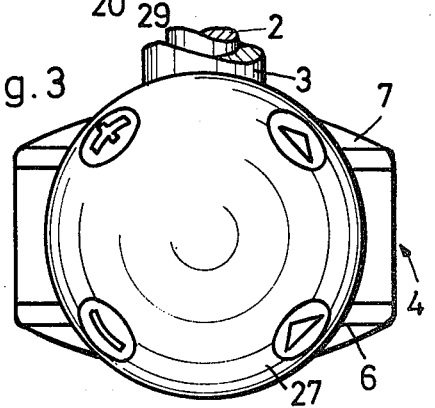
FIG. 3 is a top view of the ratchet transmission shown in FIGS. 1 and 2.

Referring now to the drawings, and more particularly to FIGS. 1-3, the reference numeral 1 generally designates the ratchet transmission of the present invention which has the purpose of selectively turning two gear-shift-levers or shafts 2 and 3, which are concentric relative to each other and end in a gear casing 4, which is placed rotatably on these shafts. The casing 4 contains, in its central portion, a circular partition 5 with a double T-cross section, which serves as a bearing for the inner gear-shift-lever shaft 2 and which is covered on its sides by the casing covers 6 and 7, which can be assembled to one unit with the partition and of which the right cover 7, as shown in FIG. 1 supports the outer hollow gear-shift-lever shaft 3. To each gear-shift-lever shaft 2 and 3, a ratchet wheel 8 and 9, respectively, is adjoined inside the casing 4, such resting on respectively opposite sides of the partition 5. The ratchet wheel 9 is connected rigidly to one end of the gear-shift-lever shaft 3, while the ratchet wheel 8 is propped over one end of the inner gear-shift-lever shaft 2 and is connected rigidly to it via a peg or pin 10, which reaches through a hub 11, which is attached to the ratchet wheel 8, protruding axially on one side.

In unison with each ratchet wheel 8 and 9 acts a pair of pawls, namely pawls 12, 13 for ratchet wheel 8 and pawls 14, 15 for ratchet wheel 9. Only the pair adjoined to wheel 8 is shown in FIG. 2. Each of these pawls 12 and 13 forms a two-armed lever, being sickle-shaped, which is, approximately in its middle, positioned on the partition 5, at respective positions on about diametrically opposite sides of the ratchet wheel 8. The bearing of the lever is formed by bearing shafts 16 and 17, for which there are axially projecting receiving studs affixed to the partition, or which could be integrally formed on the partition. The lower arms 12" and 13", respectively, of each pawl 12 and 13, as shown in FIG. 2, have noses 20 and 21, respectively, which cooperate with the toothing of the ratchet wheel 8, and form latches therefor, while the corresponding upper arms 12' and 13', with their backs 22 and 23, respectively, cooperate with a rotatable cam disc 24, which is connected with a cam shaft 25, which protrudes radially from the gear casing 4. This cam shaft 25 is held by a bearing coupling socket 26, which is set into the casing, and which carries on its free end a turning knob 27. The cam disc 24 has on the side thereof, which faces the pawls, an indenture 28, into which the upper arm of each pawl can engage with its back. A common leaf-spring 29 is adjoined to the two pawls 12 and 13, being held in the middle of the partition 5 by a receiving stud 30, and collaborating in such a way with the two lower arms 12" and 13" of the two pawls, that they are under a pre-tension in the direction of causing interlocking into the ratchet wheel 8.

The formation on the other side of the partition is identical, so that the bearing shafts 16 and 17 of the pawls 12 and 13 can be used also as bearing shafts for the pawls 14 and 15. Correspondingly, there is also a similar leaf spring provided. The securing of the pawls to the bearing shafts is accomplished by way of lock washers 32.

With this form of ratchet transmission, only one ratchet latch can be caught in the ratchet wheel, and only by turning of the cam disc 24 to cause the backs 22 and 23, respectively, of the upper arms to yield, thereby swiveling the respective pawl through the effect of the leaf spring 29, into the indenture 28. All other pawls are then not latchable with their respective ratchet wheels. One can now turn into one direction, with the aid of the cam shaft 25, with the gear casing 4, taking along one of the gear-shift-lever shafts. It can be seen, that the two sets of pawls 12, 13 and 14, 15, respectively, each serve for a contrasting turning motion of the ratchet wheel, and thereby the gear-shift-lever shafts, so that four operational motions are given.

Figure 4:
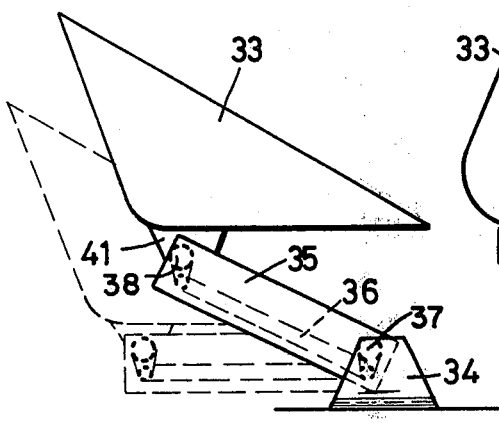
FIG. 4 is a schematic illustration of the ratchet transmission of the present invention in use for a parallelogram spring action for a seat of a vehicle.
Figure 5:
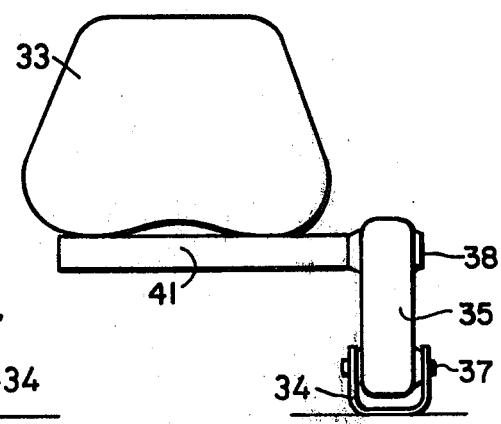
FIG. 5 is a view of the device illustrated in FIG. 4, as viewed from the front.
Figure 6:
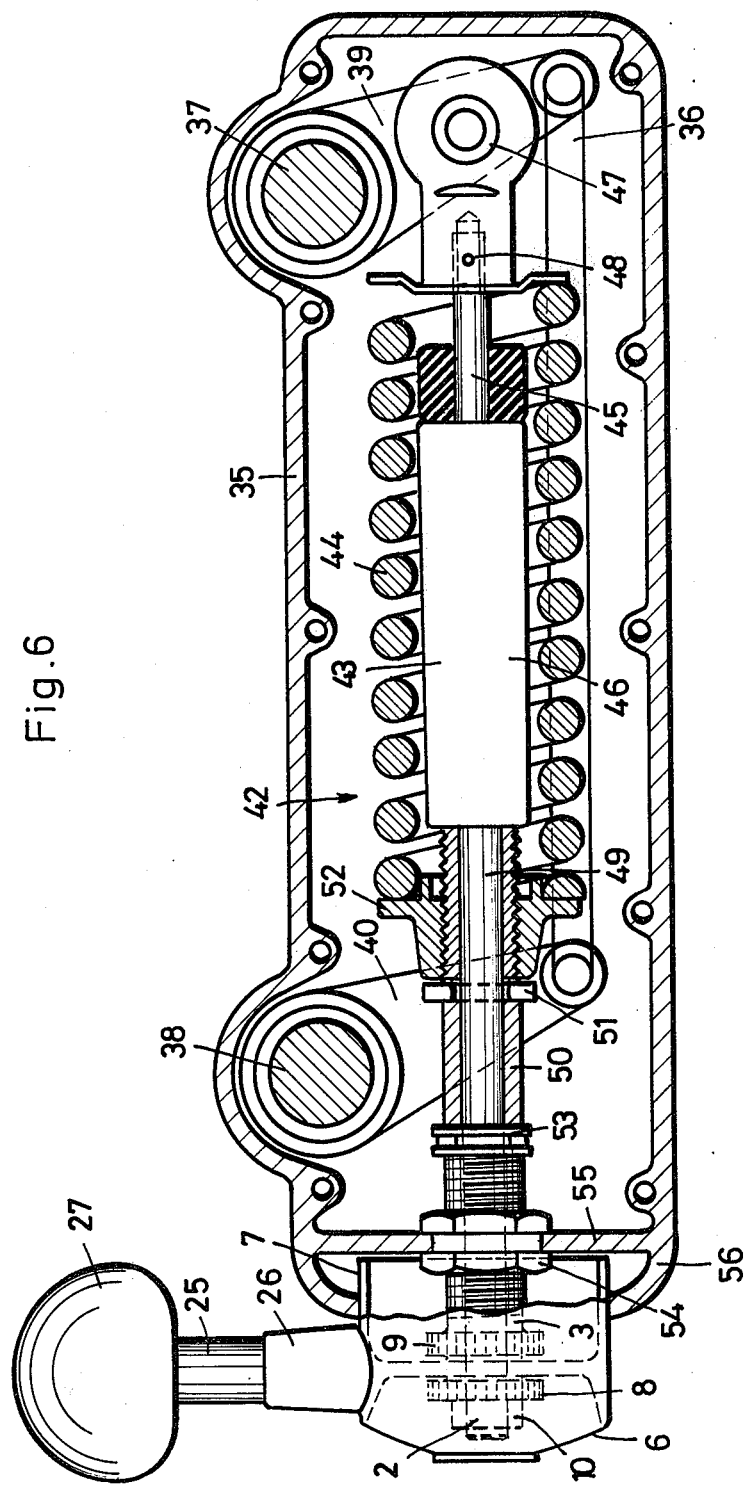
FIG. 6 is a longitudinal sectional view of the ratchet transmission and of the parallelogram spring action as illustrated in FIGS. 4 and 5.

The use of the ratchet transmission for a spring action seat for vehicles will now be explained. As shown in FIGS. 4 and 5, a seat 33 for a vehicle is supported via a one-sided parallelogram spring action by the console 34 of the vehicle. The parallelogram spring action has two guide rockers 35 and 36, which operate within each other. The outer guide rocker 35 is formed as a casing, which surrounds the inner guide rocker at a certain distance, and to which, at one end, the transmission 1 is attached, as shown in FIG. 6. At each end of the outer guide rocker, a hollow cylindrical rocking trunnion 37 and 38, respectively, is held in bearing bushings, protruding from the sides, whereby each rocking trunnion passes through the guide rocker 35. On the two rocking trunnions, lashes 39 and 40 are rigidly attached, being formed in a fork-like manner and consisting of two arms, positioned at a certain distance from each other. The free ends of the two arms of the lashes 39 and 40, which are positioned at the same side, are connected in a hinged fashion by a rod, and form together the inner guide rocker 36. The rocking trunnion 38 is connected rigidly with a seat holder 41, which carries the seat 33, and the rocking trunnion 37 is rigidly connected with the console 34, which is a rigid part of the vehicle. From this results a relative movement, if the seat is adjusted from the position originally shown in FIG. 4 with full lines to the position shown with dotted lines, between the outer guide rocker 35 and the inner guide rocker 36. Between the two guide rockers 35 and 36 a spring element 42 is inserted. This spring element consists of a shock absorber 43 and a compression spring 44. A piston rod 45 of the shock absorber 43 is indirectly jointed with the lashes 39, while its cylinder 46 rests against the left end of the casing 35. The jointing of the piston rod is accomplished via a bearing head 47, which is hinged to the lashes in such a way that the piston rod is secured against rotation by use of a pin 48. The cylinder 46 is extended in the other direction by way of a cylinder rod 49, which reaches with its free end through the casing 35 into the transmission. This free end forms the inner transmission shaft, or gear-shift-lever shaft 2. On the cylinder rod 49 sits an elevating screw 50, which is connected rigidly to the cylinder rod via a tappet 51 and carries a roving nut 52, which forms one of the buttresses for the compression spring 44, which concentrically surrounds the shock absorber 43, while the other end of the spring rests against a member carried by the bearing head 47. The elevating screw 50 is positioned over an axial compression bearing 53, against a threaded bush with male threading, which reaches through the casing 35 to the outside into the transmission 1, and whose outside forms the gear-shift-lever shaft 3. It is led with a thread mesh through a nut 54, which is rigidly connected to the casing. For this purpose, the casing 35 has a partition 55, which is preceded by a diaphragm 56, which has an opening for the attachment of the transmission, whose casing cover 7 is in this case formed as a cylindrical stud, which reaches axially adjustably through the opening.

With the ratchet transmission of the present invention, an adjustment in the height of the seat can be accomplished without affecting the level of the pretensioning of the compression spring 44. This is explained as follows. The adjustment to the height of the driver, or height adjustment of the seat, is accomplished through the outer gear-shift-lever shaft 3. A turning of this shaft delivers, due to the application of the rigidly mounted nut 54, a rotation and shifting motion, which corresponds with the screw pitch. The rotary motion is absorbed by the axial compression bearing 53, while the longitudinal motion is transmitted to the elevating screw 50, the tappet 51, the roving nut 52 and the whole spring element 42, and thereby rotates the lash 39 with the rocking trunnion 37. The connected change in configuration of the parallelogram results in the height adjustment, which fits the respective driver. The adjustment to the weight of the driver is accomplished by the pretension of the compression spring 44. This is done via the inner gear-shift-lever shaft 2. A turning of the inner gear-shift-lever shaft 2 produces, via the tappet 51, a concurring turning of the elevating screw 50, which works together with the roving nut 52. This roving nut is not rotated against the tension of the compression spring 44, which leads to a movement along its longitudinal axis, which pre-tensions and releases the compression spring 44. It would be advantageous if the roving nut 52 and the elevating screw 50 are equipped with a buttress thread, which has a lower frictional resistance than an angular thread. The adjustment of the pre-tension of the compression spring 44 to the weight of the driver can therefore be accomplished by rather easy means. The ratchet transmission can also be mounted at a distance from the parallelogram suspension, if a better operation from the seat can thereby be accomplished. The turning knob 27 should preferably be made of polyurethane foam. It preferably is equipped with acceptable symbols, which would correspond with the respective different possibilities of adjustment of the seat.

The invention therefore provides a ratchet transmission which can be used as an adjustment device for the operation of two gear-shift-lever shafts which are independent from each other. The two shafts must not necessarily lie within each other, but could, for other uses, run axially aligned and could centrically end in the casing from opposite sides.

Obviously many other modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A ratchet transmission for height and weight adjustment of suspension seats of vehicles, comprising:
   two independent gear-shift-lever shafts rotatably disposed about a common axis within a gear casing;
   a pair of ratchet wheels being respectively rigidly fixed on said gear-shift-lever shafts;
   a cam disc abutted by the gear casing;

a pair of counter-acting, pre-tensioned pawls for each of said ratchet wheels which are selectively latchable thereto by turning said cam disc; and a turning knob, protruding radially from the gear casing, and swivelable therewith around the axis of said gear-shift-lever shaft.

2. A ratchet transmission as set forth in claim 1, wherein each of said pawls is formed as a two-armed lever, one arm being pressed by pre-tension against said cam disc, said cam disc having an indenture into which one of said one arms of said pawls at a time can be engaged, whereby the other of said arms can latch into the adjoining respective ratchet wheel of said pawl.

3. A transmission as set forth in claim 2, further comprising a common leaf spring for each of said pairs of pawls for urging said other arms of said pawls into latching engagement with the respective ratchet wheel.

4. A transmission as set forth in claim 3, wherein the two pawls adjoining a given ratchet wheel are basically positioned together with the leaf spring in one plane at diametrically opposed sides of the gear-shift-lever shaft.

5. A transmission as set forth in claim 4, wherein the two ratchet wheels are positioned at opposite sides of a partition wall of the gear casing, to which bearing shafts of the pawls and receiving studs for the leaf springs are affixed.

6. A transmission as set forth in claim 5, wherein said partition has on its outer circumference a T-flange, onto which at least from one side a casing cover can be attached axially and which provides an axially protruding bearing coupling socket for said turning knob.

7. A transmission as set forth in claim 6, wherein said gear-shift-lever shafts are concentrically arranged.

8. A transmission as set forth in claim 7, wherein said gear casing is placed by way of said partition on the inner gear-shift-lever shaft.

9. A transmission as set forth in claim 8, wherein said gear casing is placed on the outer gear-shift-lever shaft by way of a gear casing cover.

10. A transmission as set forth in claim 9, wherein said ratchet wheel is disposed on the inner gear-shift-lever shaft and is detachable therefrom.

11. A transmission as set forth in claim 10 for use with an oscillating suspension for seats, which consists of a guide system to lead the seat in a straight line and a spring component, adjoined between two relatively movable parts, said spring component being movable as a whole, free of tension, for the purpose of height adjustment, through one of said gear-shift-lever shafts, and can be pre-tensioned through the other of said gear-shift-lever shafts.

12. A transmission as set forth in claim 11, further comprising an elevating screw turnable by said inner gear-shift-lever shaft and having a roving nut thereon, which forms a movable buttress of the spring component, being axially adjustable, and which itself is movable together with the elevating screw through the outer gear-shift-lever shaft.

13. A transmission as set forth in claim 12, for an oscillating suspension in the form of a guide parallelogram, whose two parallelogram guide rockers are positioned within each other, whereby the outer parallelogram guide rocker is shaped as a hollow cylinder with bearings at each end, and in these bearings the one end of lashes for a seat holder and for a chassis-affixed console, respectively, are rigidly fixed, whose other ends receive one parallelogram guide rocker in the form of a joint, whereby the spring component rests with one end against one of the lashes and with the other against the outer guide rocker of the parallelogram, and wherein the spring component is formed by a shock absorber and by a compression spring thereabout, the cylinder of the shock absorber being rigidly connected with the inner gear-shift-lever shaft and the elevating screw resting via an axial compression bearing with its front against the outer gear-shift-lever shaft, which is itself resting turnably via an immovable nut against the outer guide rocker of the parallelogram.

* * * * *